(12) United States Patent
Perng et al.

(10) Patent No.: US 9,578,308 B2
(45) Date of Patent: Feb. 21, 2017

(54) METHOD AND APPARATUS FOR LOW COST 3D VIDEO MAKING

(71) Applicant: Google Inc., Mountain View, CA (US)

(72) Inventors: Charles Perng, Sunnyvale, CA (US); Haixun Wang, Palo Alto, CA (US); Hao Yang, San Jose, CA (US); Zhen Wen, Summit, NJ (US)

(73) Assignee: GOOGLE INC., Mountain View, CA (US)

( * ) Notice: Subject to any disclaimer, the term of this patent is extended or adjusted under 35 U.S.C. 154(b) by 134 days.

(21) Appl. No.: 14/573,068

(22) Filed: Dec. 17, 2014

(65) Prior Publication Data

US 2016/0182888 A1   Jun. 23, 2016

(51) Int. Cl.
| | |
|---|---|
| *H04N 13/02* | (2006.01) |
| *H04N 5/232* | (2006.01) |
| *H04N 5/222* | (2006.01) |
| *H04N 5/225* | (2006.01) |

(52) U.S. Cl.
CPC ..... *H04N 13/0239* (2013.01); *H04N 5/23206* (2013.01)

(58) Field of Classification Search
USPC ..... 396/325, 419, 421; 348/47, 143, 208.99, 348/376
See application file for complete search history.

(56) References Cited

U.S. PATENT DOCUMENTS

| | | |
|---|---|---|
| 2010/0194860 A1 | 8/2010 | Mentz et al. |
| 2015/0271483 A1* | 9/2015 | Sun ...................... H04N 17/002 348/187 |

OTHER PUBLICATIONS

Zurb.com Article.*
http://mashable.com/2011/05/30/how-to-make-3d-videos/.
http://thecoolgadgets.com/innovative-3d-hd-video-recorder-combining-two-kodak-hd-zxl-cameras/.
http://video-cameras.wonderhowto.com/how-to/build-3d-video-camera-using-2-flip-mino-hd-cameras-367641/.
http://zurb.comiarticle/394/make-your-own-3d-video-in-three-easy-step.
https://www.kibin.com/essay-examples/how-to-record-3d-videos-or-pictures-using-2-iphones-hCHxhFnA.

* cited by examiner

*Primary Examiner* — Aung S Moe
*Assistant Examiner* — Euel Cowan
(74) *Attorney, Agent, or Firm* — Morris & Kamlay LLP (57) ABSTRACT

Video capture devices may be held in a frame having at least two openings and a plurality of slots on a first side and a plurality of tabs on a second side opposite the first side, the slots and tabs positioned such that when the frame is folded by folding the first side toward the second side, the tabs may be folded toward the first side, inserted into the slots and then folded parallel to the first side to secure the frame in a closed position. An application on a first device in the frame may establish a connection with a second device in the frame, synchronize a clock in the first device with a clock in the second device, initiating simultaneous video capture, record data indicating changes in orientation of the devices, and transmit the captured videos and the data indicating changes in orientation to a video processing tool.

13 Claims, 6 Drawing Sheets

METHOD AND APPARATUS FOR LOW COST 3D VIDEO MAKING

BACKGROUND

Three-dimensional (3D) video refers to video which has been enhanced to create the illusion of depth. A 3D video may be created by recording a scene from two different perspectives. Typically, an expensive stereoscopic camera is used to capture video.

BRIEF SUMMARY

According to an embodiment of the disclosed subject matter, a frame is provided having two openings and a plurality of slots on a first side and a plurality of tabs on a second side opposite the first side, the slots and tabs being positioned such that when the frame is folded the tabs may be folded toward the first side, inserted into the slots and folded parallel to the first side to secure the frame in a closed position. Each of the tabs includes a base portion which secures a device within the frame and supports the first side and a protrusion portion which is inserted through the corresponding slot. The frame, in a closed position, holds two devices such that respective displays of the devices are visible through the two openings.

According to an embodiment of the disclosed subject matter, a method is provided for executing an application on a first device to establish a connection between the first device and the second device, synchronizing a clock in the first device with a clock in the second device, initiating, in the first device, simultaneous video capture in the first device and the second device, recording, in the first device and second device, data indicating changes in orientation of the first device and second device, respectively, during the video capture, and transmitting the captured videos and the data indicating changes in orientation to a video processing tool.

According to an embodiment of the disclosed subject matter, a system is provided having a frame configured to hold a first video capture device and a second video capture device, the first video capture device including a storage device, a memory that stores computer executable components, and a processor that executes the following computer executable components stored in the memory: an interface component that establishes a connection between the first device and the second device, a synchronization component that synchronizes a clock in the first device with a clock in the second device, a control component that initiates, in the first device, simultaneous video capture in the first device and the second device, a recording component that records data indicating changes in orientation of the first device and second device, respectively, during the simultaneous video capture, and a transmission component that transmits the captured videos and the data indicating changes in orientation to a video processing tool.

According to an embodiment of the disclosed subject matter, means for establishing a connection between the first device and the second device, synchronizing a clock in the first device with a clock in the second device, initiating, in the first device, simultaneous video capture in the first device and the second device, recording, in the first device and second device, data indicating changes in orientation of the first device and second device, respectively, during the video capture, and transmitting the captured videos and the data indicating changes in orientation to a video processing tool are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

According to the present disclosure, video data may be captured by two video capture devices held in a frame. The devices may be controlled to synchronize operational clocks, simultaneously capture video, and record data indicating changes in orientation. The captured videos and the data indicating changes in orientation may be transmitted to a video processing tool for further processing, for example, combination into a 3D video.

Figure 1:
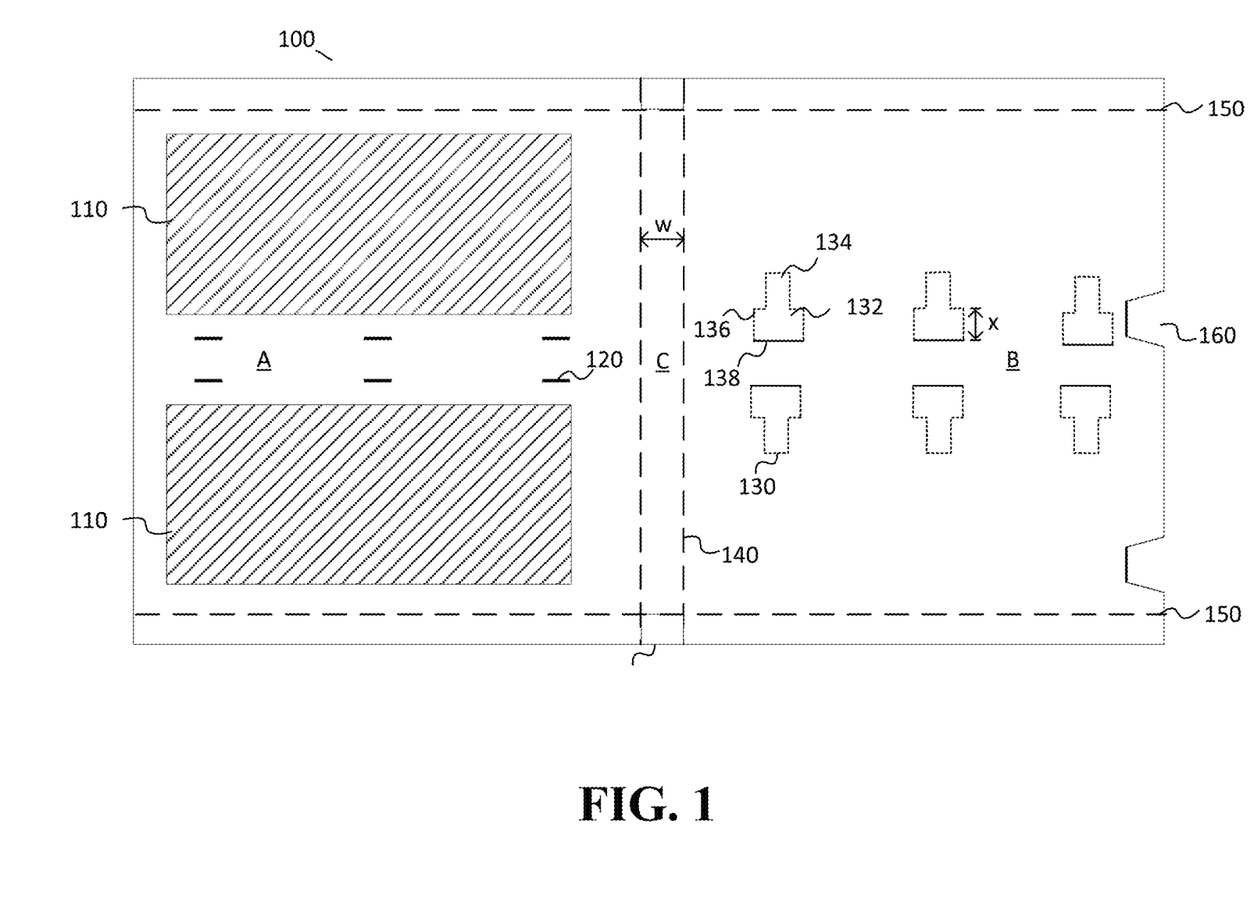
FIG. 1 shows a frame apparatus in an open position according to an embodiment of the disclosed subject matter.

FIG. 1 shows an example layout of a frame 100 for holding two video capture devices at a fixed, constant distance from each other. Although frame 100 is illustrated in an embodiment to hold two video capture devices, it should be understood that the frame 100 may be designed to hold three or more video capture devices without departing from the scope of the present disclosure.

Frame 100 may be manufactured to be assembled by an end user and include features to facilitate the assembly process, as will be described. Frame 100 may be divided generally into a first side A, a second side B, and a middle portion C. Side A includes a plurality of slots 120 and a plurality of openings 110 through which displays of mounted video capture devices may be viewed. The plurality of openings 110 may be precut in the frame 100 or may be designated by lines in the frame 100 for the user to cut out, or designated by perforated outline which the user may punch out. Side B includes a plurality of tabs 130 aligned to be inserted into the plurality of slots 120 when the frame 100 is in a closed position. It should be understood that although three slots 120 and tabs 130 are illustrated, any number of one or more slots 120 and tabs 130 may be used. Sides A, B and C may be formed in one continuous unit or may be formed of individual segments joined together.

Frame 100 may be constructed of an inexpensive material, for example and without limitation, cardboard, plywood, plastic, or wood. Frame 100 may therefore provide a relatively inexpensive yet efficient tool for capturing a plurality of streams of video. Furthermore frame 100 may be quickly assembled by a user without the requirement of complicated instructions or tools. For example, a cardboard embodiment of frame 100 may be manufactured at low cost and distributed freely as part of a promotion for do-it-yourself 3D video enthusiasts.

In the embodiment illustrated in FIG. 1, frame 100, in an open position, may include creases 140, 150 delineating foldable points in the frame 100. The placement and alignment of creases 140, 150 may be positioned to accommodate particular devices which the frame 100 is designed to hold or may be positioned to form general, universal sized chambers for holding any of a plurality of types of video capture devices.

For illustrative purposes, an embodiment of the frame 100 will be described in reference to video capture device being a mobile phone device having a display on a first side and a camera on a second side opposite the first side. Such a configuration may be described as having a display on the "front" of the device that faces the user when the mobile phone device is in use, and a camera on the "back" side that typically faces away from the user. However, it should be understood that the subject matter of the present disclosure may be applied to other video capture enabled devices, including for example, camcorders, pocket camcorders, MP3 players, global positioning system (GPS) devices, media players, handheld gaming devices and other devices which include a display and a camera. The position of the camera on the video capture device is not limited to either the first or second side, nor to any particular position, as will be seen below.

A first mobile phone and a second mobile phone may be placed on the open frame 100, each phone being oriented with the respective displays facing toward the openings 110. Tabs 130 may be folded to a raised position such that the tabs 130 are perpendicular with the surface of side B. To facilitate raising the tabs 130, the tabs 130 may include perforated edges 136 which may be separated from the surface of side B, and a crease 138, by which the tab 130 may be folded into a perpendicular position. With the tabs 130 raised and the mobile phone displays aligned to be viewed through the openings 110, the frame 100 may be folded at crease lines 140 such that side B is folded over toward side A and side C is positioned perpendicular to both of side A and side B, which in turn are parallel to each other, thereby adjusting the frame into a closed position.

Each of tabs 130 may include a base portion 132 and a protrusion portion 134. When side B is folded to meet side A, the protrusion portion 134 of each tab 130 may be inserted into a corresponding slot 120. The base portion 132 may have a height x approximately equal to a width w of side C. Height x and width w may be determined according to a width of the mobile phone or class of device to be held within frame 100. For example, x and w may be set to provide frame 100 with dimensions to accommodate holding a certain video capture device.

Figure 2:
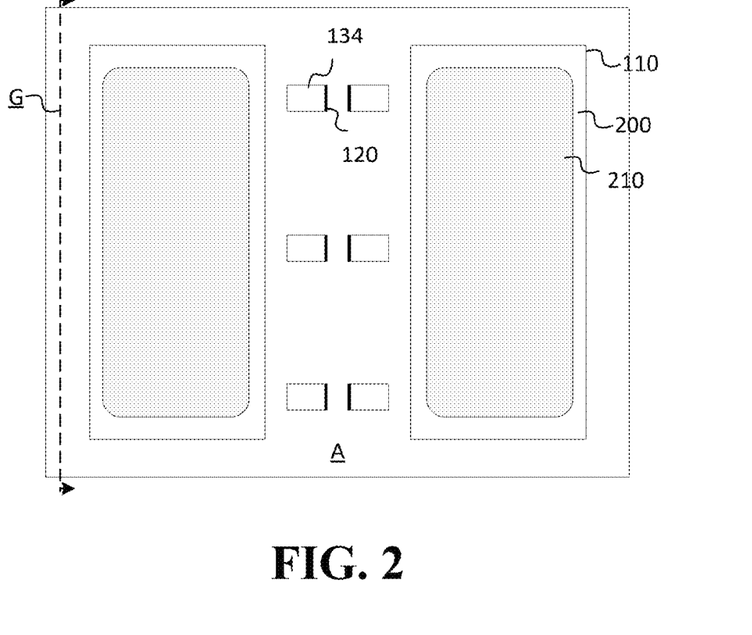
FIG. 2 shows a front view frame apparatus in a closed position according to an embodiment of the disclosed subject matter.

FIG. 2 shows a back view of the closed frame 100. Protrusions 134 may be seen inserted through slots 120 and folded to either side to secure the frame 100 in a closed position. Protrusions 134 may include fasteners to further secure the frame 100 in the closed position. For example, protrusions 134 and the surface of side A may include hook and loop type fasteners, clasp type fasteners, male and female type fasteners, or other types of fasteners which may attach protrusions 134 to side A. A first fastening device may be fixed onto the protrusions 134, which may attach to a second fastening device fixed onto side A. A display 210 of the video capture device 200 may be seen through each of the openings 110.

Figure 3:
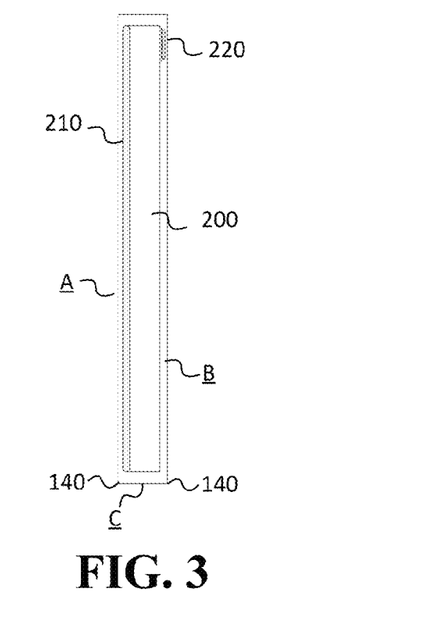
FIG. 3 shows a side view of a frame apparatus in a closed position according to an embodiment of the disclosed subject matter.

FIG. 3 shows a side view of the closed frame 100 as seen from the perspective of the line G in FIG. 2. Middle portion C forms a spacer which separates sides A and B. Side A is folded toward side B along creases 140. A display 210 of the video capture device 200 faces toward side A, and a camera 220 of the video capture device 200 faces toward side B.

Figure 4:
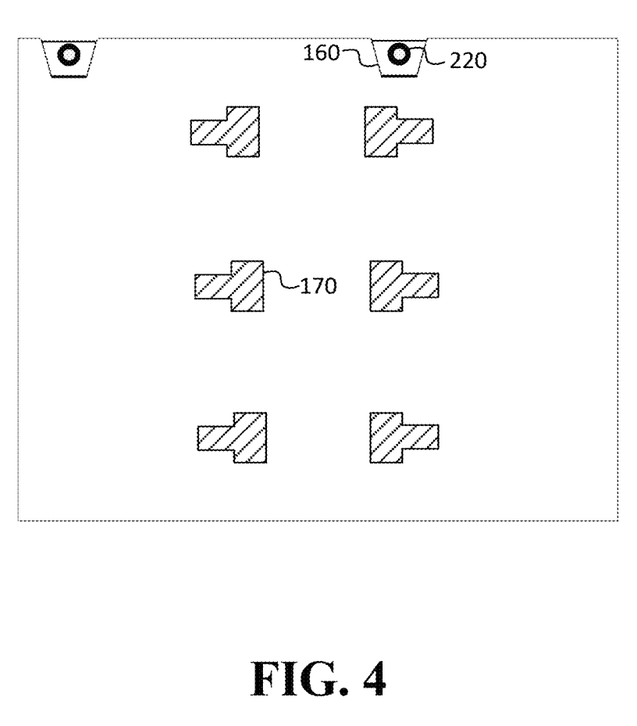
FIG. 4 shows a back view of a frame apparatus in a closed position according to an embodiment of the disclosed subject matter.

FIG. 4 shows a front view of the closed frame 100. Frame 100 may include notches 160 to provide the camera 220 with an unobstructed view. Holes 170 may be visible where the tabs 130 have been folded away. Notches 160 may be positioned as required according to the position of the camera 220 on the mobile phone 200. Alternatively, notches 160 may be replaced with holes (not illustrated) further away from the edge if the position of the camera is closer to a middle section of the mobile phone 200 instead of close to an edge of the device. Notches 160 may be omitted if frame 100 is designed for a device which extends beyond the edge of the frame 100 and does not require any notch or hole to provide the camera 220 with an unobstructed view.

Accordingly, frame 100 provides a low-cost, easy to assemble apparatus to hold two mobile phones (or other video capture devices) while capturing video for a 3D video. When two mobile phones 200 are placed in the closed frame 100, the frame 100 may hold the mobile phones at a constant distance from each other. The mobile phones may thereby capture video providing two perspectives of the same scene. The captured videos may be processed by a video processing tool to be combined to create a 3D effect using any of various techniques, for example, anaglyph, polarization, interference filter, etc., or other techniques.

Although the frame 100 provides consistent perspectives for the purpose of capturing video to be used to create 3D video, other differences between the two phones may detract from the quality of the final video result. Therefore, the frame 100 may be used as part of a system, as described below, which provides additional controls that improve the synchronization of the video capture process and ultimately improves the final resulting 3D video.

Figure 5:
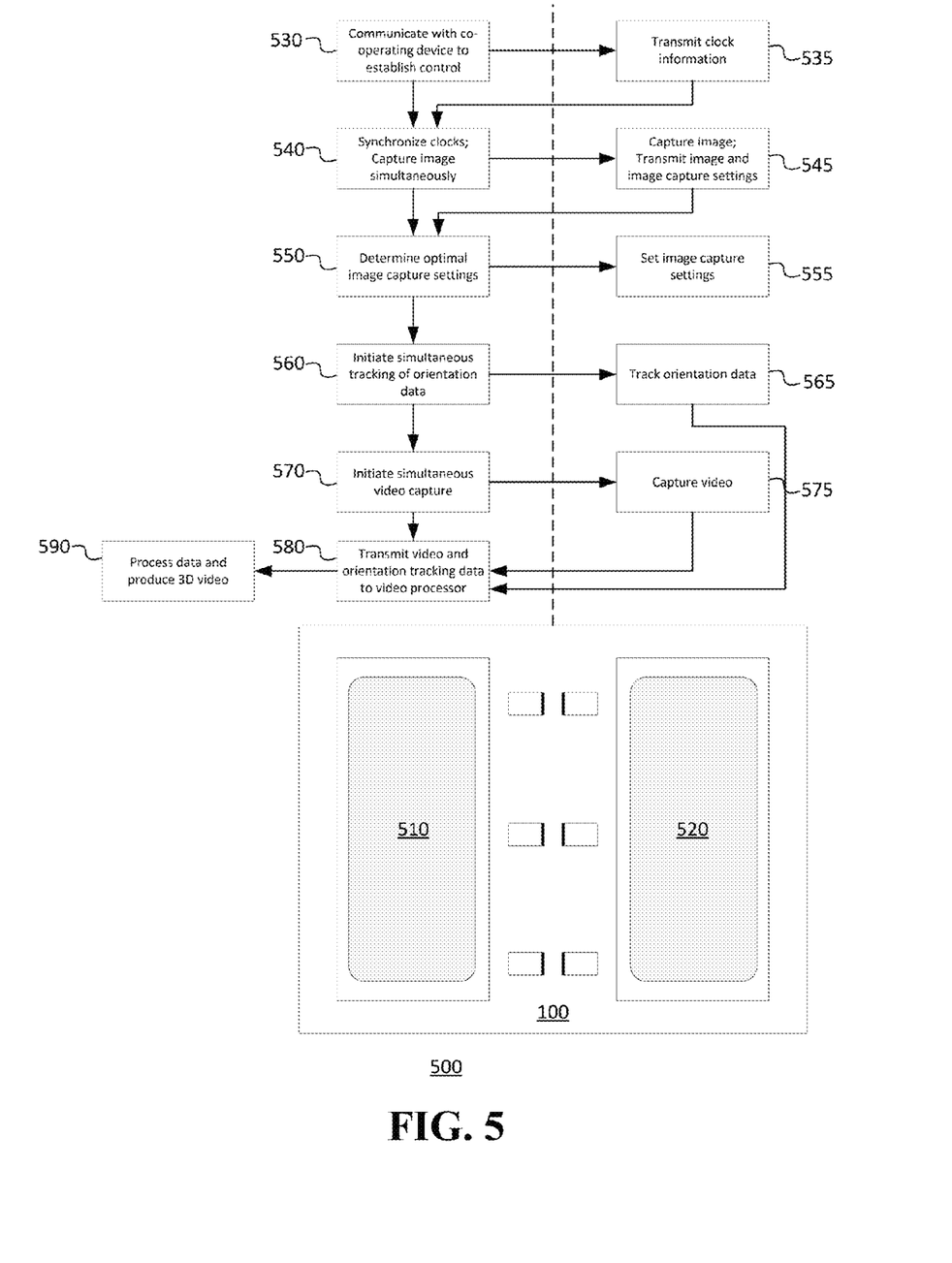
FIG. 5 shows operations of devices held in a frame in a closed position according to an embodiment of the disclosed subject matter.

FIG. 5 shows a system 500 including a frame 100 and two mobile phones 510, 520. In the system 500, mobile phone 510 is configured to control calibration operations and video capture in order to provide improved results in the video output.

At operation 530, the system 500 begins by establishing a connection between the first mobile phone 510 and the second mobile phone 520. The connection may be established, for example, by physically connecting the two phones or by executing an application on one or both of the phones configured to establish a wireless connection between the first mobile phone 510 and the second mobile phone 520. A wireless connection may be established, for example, over a network such as the Internet, over a local area network such as a WiFi network, via radio connection such as Bluetooth®, other near-field communication (NFC) techniques, or other types of wireless communication. The connection may allow the first mobile phone 510 to control certain functions in the second mobile phone 520 and for the two devices to exchange data.

At operation 535, the second mobile phone 520 notifies the first device that the connection is established and transmits clock information. At operation 540 the first mobile phone 510 synchronizes the clocks in the first mobile phone 510 and second mobile phone 520 and initiates simultaneous image capture in both of the first mobile phone 510 and the second device. At operation 545 the second mobile phone 520 transmits the captured image and the image capture settings to the first mobile phone 510.

At operation 550 the first mobile phone 510 compares the simultaneously-captured images and determines improved or optimal image capture settings for both devices. For example, the application running on the first mobile phone 510 may align the two images and estimate differences in the image capture parameters of the two devices, e.g., resolution, focus, zoom level, etc. The first mobile phone 510 may send instructions to the second mobile phone 520 to adjust its parameters to better match the first mobile phone 510 in order to obtain identical images. If such instructions are sent, at operation 555 the second mobile phone 520 sets its image capture settings according to the received instructions. Alternatively or in addition, the first mobile phone 510 may adjust parameters used by the first mobile phone 510 to more closely match those of the second mobile phone 520.

At operation 560 the first mobile phone 510 initiates a simultaneous tracking of orientation data in both the first mobile phone 510 and the second mobile phone 520. For example, both devices may include a gyroscope or gyroscopic sensors which may record data indicating an orientation of the respective device. At operation 565 the second mobile phone 520 responds to the instruction from the first mobile phone 510 and begins to record orientation data.

At operation 570 the first mobile phone 510 initiates simultaneous video capture in both devices. The simultaneous video capture may be initiated in any number of ways, for example, via a one-click button on first mobile phone 510, voice-control, brain-wave click, etc. Different advantages may be obtained based on the models of the first mobile phone 510 and second mobile phone 520.

At operation 575 the second mobile phone 520 begins to capture video simultaneously or substantially simultaneously with the first mobile phone 510. Upon completion of capturing the videos, at operation 580 the first mobile phone 510 transmits the two captured videos and the orientation tracking data to a video processor.

At operation 590 the video processor processes the videos and the data to optimize production of a 3D video. For example, since the two devices 510, 520 have synchronized clocks, the two video streams may be synced based on the video timestamps. Furthermore, although the frame 100 holds the two mobile phones 510, 520 at a constant distance, slight independent movements may still occur. The video processor may use an image matching method together with the orientation data to estimate any incongruous movement between the two mobile phones 510, 520. Based on the estimated relative movement, the video processor may use image stabilization techniques to modify image frames in order to compensate for the relative motion. More generally, the video processor may be configured to align the captured videos by matching images in a frame of video having a same timestamp, estimate a movement of the mobile phone 510 relative to the mobile phone 520 or vice versa based on the data indicating changes in orientation, and apply image stabilization to compensate for the estimated movement.

The function of the video processor may be included in the first device, provided in an external device in communication with the first mobile phone 510, or provided as a cloud-based tool which receives uploads from the first mobile phone 510 and handles processing and production of the 3D video. For example, in an embodiment, after capturing video, a user of the system 500 could upload the two video streams, together with the streams of orientation changes, to a cloud-based video processing tool which will improve the alignment and produce a 3D video.

The order of operation is not limited to the order described above. Certain operations may be performed before or after other operations. Furthermore, operations may be omitted or included in accordance with the capabilities of the devices used.

Figure 6:
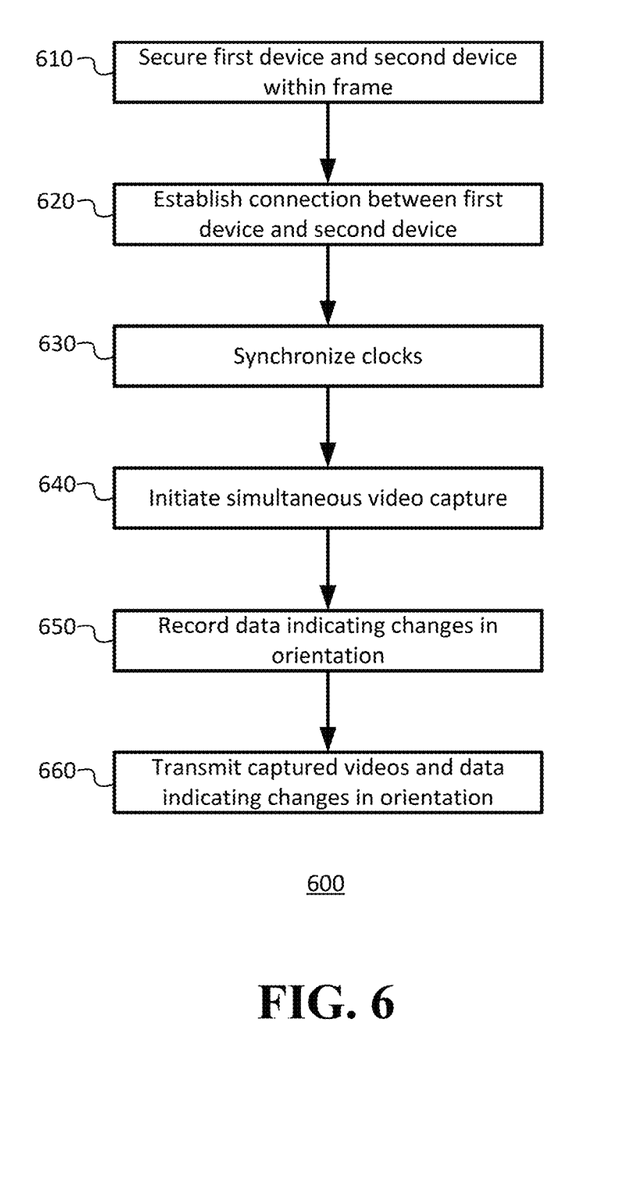
FIG. 6 shows an operational flowchart according to an embodiment of the disclosed subject matter.

FIG. 6 is a flowchart of an example process according to an embodiment. At operation 610, the first and second video capture devices are secured in a frame, for example, the frame 100 as described referring to FIG. 1. At operation 620 a connection is established between the first and second video capture devices. At operation 630 the clocks of the first and second video capture devices are synchronized. At operation 640 the first and second video capture devices execute simultaneous video capture. At operation 650 the first and second video capture devices record data indicating changes in orientation of each of the respective devices. At operation 660 the captured videos and the data indicating changes in orientation of the video capture devices may be transmitted to a video processor to produce a 3D video.

Figure 7:
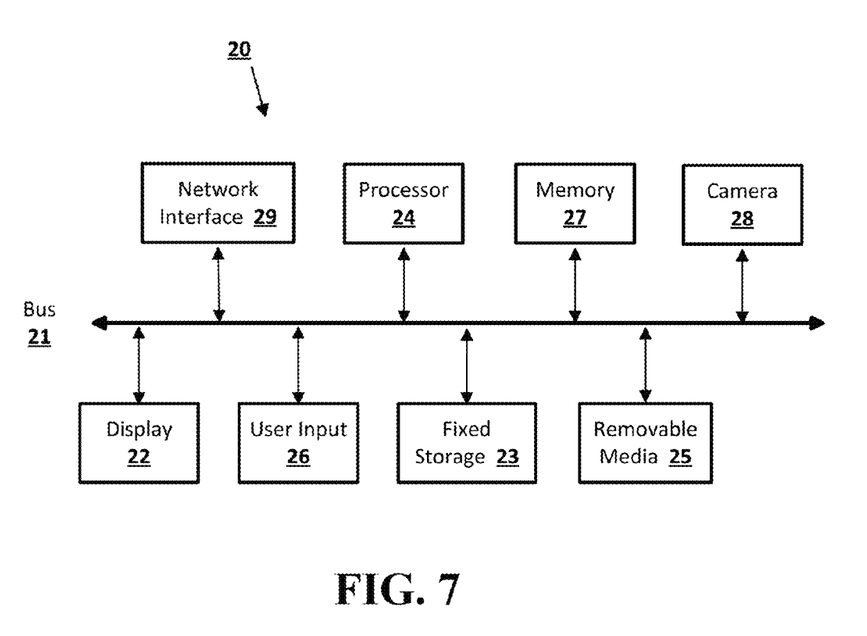
FIG. 7 shows a computing device according to an embodiment of the disclosed subject matter.

Embodiments of the presently disclosed subject matter may be implemented in and used with a variety of component and network architectures. FIG. 7 is an example video capture device 20 suitable for implementing embodiments of the presently disclosed subject matter. The device 20 may be, for example, a mobile computing device such as a camera, camcorder, smart phone, tablet, GPS device, media player, gaming device or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keypad, touch screen, and the like, a fixed storage 23 such as a hard drive, flash storage, and the like, a removable media component 25 operative to control and receive an optical disk, flash drive, and the like, a camera 28, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The processor 24 may be configured to execute computer executable components stored in the one or more memory components, including, but not limited to an interface component that establishes a connection between the first device and the second device, a synchronization component that synchronizes a clock in the first device with a clock in the second device, a control component that initiates, in the first device, simultaneous video capture in the first device and the second device, a recording component that records data indicating changes in orientation of the first device and second device, respectively, during the simultaneous video capture, and a transmission component that transmits the captured videos and the data indicating changes in orientation to a video processing tool. The executable components may further include a video processing component configured to provide the functionality of the video processor tool described herein.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., microphones, speakers, flashes, accessory devices and so on). Conversely, all of the components shown in FIG. 7 need not be present to practice the present disclosure. The components can be interconnected in different ways from that shown. The operation of a device such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
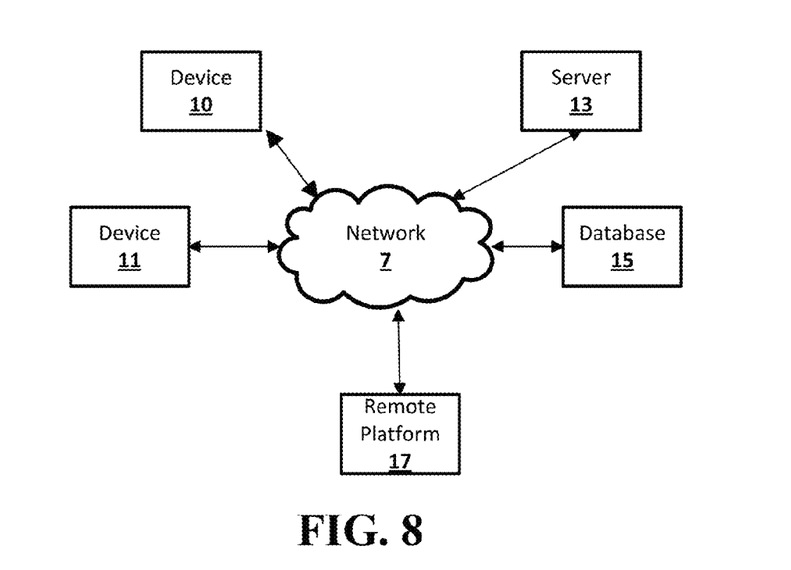
FIG. 8 shows a network configuration according to an embodiment of the disclosed subject matter.

FIG. 8 shows an example network arrangement according to an embodiment of the disclosed subject matter. One or more video capture devices 10, 11, such as cameras, smart phones, media players, tablet computing devices, and the like may connect to other devices via one or more networks 7. Each device may be a video capture device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and video processing services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method, comprising:
   placing a first and second mobile video capture devices onto a rigid frame at a preset distance apart such that cameras of the devices face in a same direction, the frame having a single orientation configuration;

executing an application on the first device to establish a connection between the first device and the second device;

synchronizing a clock in the first device with a clock in the second device;

initiating, in the first device, simultaneous video capture in the first device and the second device;

recording, in the first device and second device, data indicating changes in orientation due to independent, incongruous movement of the first device and second device, respectively, during the video capture; and transmitting the captured videos and the data indicating changes in orientation to a video processing tool;

estimating a movement of the first device relative to the second device or vice versa based on the data indicating changes in orientation;

applying image stabilization to compensate for the estimated movement; and creating a corrected final 3-dimensional (3D) video.

2. The method of claim 1, wherein the synchronizing, initiating, recording and transmitting operations are each handled by the application running on the first device.

3. The method of claim 1, further comprising synchronizing the two captured video streams based on a clock timestamp included respectively in the two captured video streams.

4. The method of claim 1, wherein initiating simultaneous capture by the first device comprises:

executing a calibration operation by capturing an image with the first device and the second device, respectively;

aligning the two captured images and estimating a difference in device setting parameters of the first device and second device based on a comparison of the aligned images; and transmitting an instruction to the second device to adjust the second device setting parameters.

5. The method of claim 1, wherein the connection between the first device and the second device is established via Bluetooth, near field communication, or a WiFi network.

6. The method of claim 1, wherein the video processing tool generates a 3D video based on the captured videos and the data indicating changes in orientation.

7. The method of claim 5, wherein the video processing tool is configured to:

align the captured videos by matching images in a frame of video having a same time stamp.

8. A system, comprising:

a rigid frame configured to hold a first video capture device and a second video capture device at a preset distance apart such that cameras of the devices face in a same direction, the frame having a single orientation configuration and the first video capture device including:

a storage device;

a memory that stores computer executable components; and a processor that executes the following computer executable components stored in the memory:

an interface component that establishes a connection between the first device and the second device;

a synchronization component that synchronizes a clock in the first device with a clock in the second device;

a control component that initiates, in the first device, simultaneous video capture in the first device and the second device;

a recording component that records data indicating changes in orientation of the first device and second device, respectively, during the simultaneous video capture; and a transmission component that transmits the captured videos and the data indicating changes in orientation to a video processing tool;

wherein the video processing tool is configured to:

estimate a movement of the first device relative to the second device or vice versa based on the data indicating changes in orientation;

apply image stabilization to compensate for the estimated movement; and create a corrected final 3-dimensional (3D) video.

9. The system of claim 8, wherein the synchronization component synchronizes the two captured video streams based on a clock timestamp included respectively in the two captured video streams.

10. The system of claim 8, wherein the simultaneous video capture comprises:

executing a calibration operation by capturing an image respectively with the first device and the second device;

aligning the two captured images and estimating a difference in device setting parameters of the first device and second device based on a comparison of the aligned images; and sending an instruction to the second device to adjust the device setting parameters.

11. The system of claim 8, wherein the connection between the first device and the second device is established via Bluetooth, near field communication, or a WiFi network.

12. The system of claim 8, wherein the video processing tool is configured to:

align the captured videos by matching images in a frame of video having a same time stamp.

13. The method of claim 1, wherein the data indicating changes in orientation of the first device and the second device is recorded using gyroscopic sensors in the first device and the second device, and the data is separate from the captured image data.

* * * * *